(12) United States Patent
Mariman et al.

(10) Patent No.: US 7,448,334 B2
(45) Date of Patent: Nov. 11, 2008

(54) FLAT TYPE SEED METER DISK WITH AXIALLY OFFSET SURFACE

(75) Inventors: Nathan Albert Mariman, Mahomet, IL (US); James Randall Peterson, Annawan, IL (US)

(73) Assignee: Deere & Company, Moline, IL (US)

( * ) Notice: Subject to any disclaimer, the term of this patent is extended or adjusted under 35 U.S.C. 154(b) by 395 days.

(21) Appl. No.: 11/273,363

(22) Filed: Nov. 14, 2005

(65) Prior Publication Data

US 2007/0107645 A1    May 17, 2007

(51) Int. Cl.
*A01C 7/00* (2006.01)
*A01C 9/00* (2006.01)

(52) U.S. Cl. ....................................................... 111/185

(58) Field of Classification Search ................. 111/184, 111/185
See application file for complete search history.

(56) References Cited

U.S. PATENT DOCUMENTS

| | | | |
|---|---|---|---|
| 4,613,056 A | 9/1986 | Olson | 221/211 |
| 6,176,393 B1 * | 1/2001 | Luxon | 221/211 |
| 6,499,414 B2 | 12/2002 | Dunham | 111/174 |

\* cited by examiner

*Primary Examiner*—Christopher J. Novosad

(57) ABSTRACT

A flat disk type circular seed disk is provided with a series of circumferentially arranged seed attracting apertures. The apertures are spaced along a circumferential rim offset axially from the remainder of the disk to approximate the seed release location and characteristics of a cell type seed disk. The offset allows the seed to fall in the correct location of the seed tube to reduce or eliminate unwanted seed bounce and provide better seed delivery to the ground and better seed spacing as compared to flat disks without the offset. In one embodiment, the rim has a surface angled with respect to the rotational plane of the seed disk to impart an axial component to the seed trajectory. A tortuous wall between the rim and the remainder of the disk provides seed agitation.

20 Claims, 7 Drawing Sheets

FLAT TYPE SEED METER DISK WITH AXIALLY OFFSET SURFACE

FIELD OF THE INVENTION

The present invention is directed to a rotatable seed disk for a vacuum seed meter having offset for improved seed trajectory.

BACKGROUND OF THE INVENTION

Seed meters are used by agricultural seeding machines to control the rate at which seed is applied to a field. Air pressure meters use either positive or negative air pressure to direct seed to apertures formed in a rotating seed disk and to hold the seed in the apertures until a preselected release point is reached. Sealing or cut-off structure on the seed meter typically is used to isolate a portion of the rotatable seed disk from the air pressure source so that the seed is released from the apertures. The seed then follows a trajectory away from the disk into a seed tube or the like towards the ground.

Air pressure seed meters commonly utilize plastic seed disks which vary in configuration depending on the type and size of seeds being metered. For example, a vacuum meter may use either a celled seed disk or a flat seed disk installed at a given location on a driven hub. The seed trajectory off the disk in the release area typically varies with the type of seed disk being used. The trajectory off the celled disk tends to be more centered relative to the seed tube entry walls than the trajectory for the flat disk, which is closer to the proximate seed tube wall. If the trajectory for the celled disk is optimized, the seed drop will not be in the optimum location for the flat disk. As a result, the seeds released from the flat disk will be offset more from center and will tend to bounce off of the proximate wall instead of falling towards the desired location within the seed tube. The seed bounce off the proximate wall produces unwanted seed spacing variations.

SUMMARY OF THE INVENTION

It is therefore an object of the present invention to provide an improved seed disk which overcomes the aforementioned problems. It is another object to provide such a seed disk for improved seed trajectory to reduce or eliminate unwanted seed bounce as the seed moves from the seed release point towards the ground.

It is a further object of the present invention to provide a seed disk configuration that provides generally identical seed trajectories for both a flat seed disk and a celled disk so that the meter can be placed in the same position for both seed disks.

A flat disk type circular seed disk is provided with a series of circumferentially arranged seed attracting apertures. The apertures are spaced along a circumferential rim offset axially from the remainder of the disk to approximately duplicate the seed release location and characteristics of a cell type seed disk. The offset allows the seed to fall in the correct location of the seed tube to reduce or eliminate unwanted seed bounce and provide better seed delivery to the ground and better seed spacing as compared to flat disks without the offset. The wall between the rim portion and the remainder of the disk defines a seed agitation area to improve seed pickup. In a further embodiment of the invention, the axially facing surface of the rim is angled with respect to the rotational plane of the disk to impart an axial component to the seed trajectory and improve seed location at the seed tube.

These and other objects, features and advantages of the present invention will become apparent from the following description in view of the drawings.

DESCRIPTION OF THE PREFERRED EMBODIMENT

Figure 1:
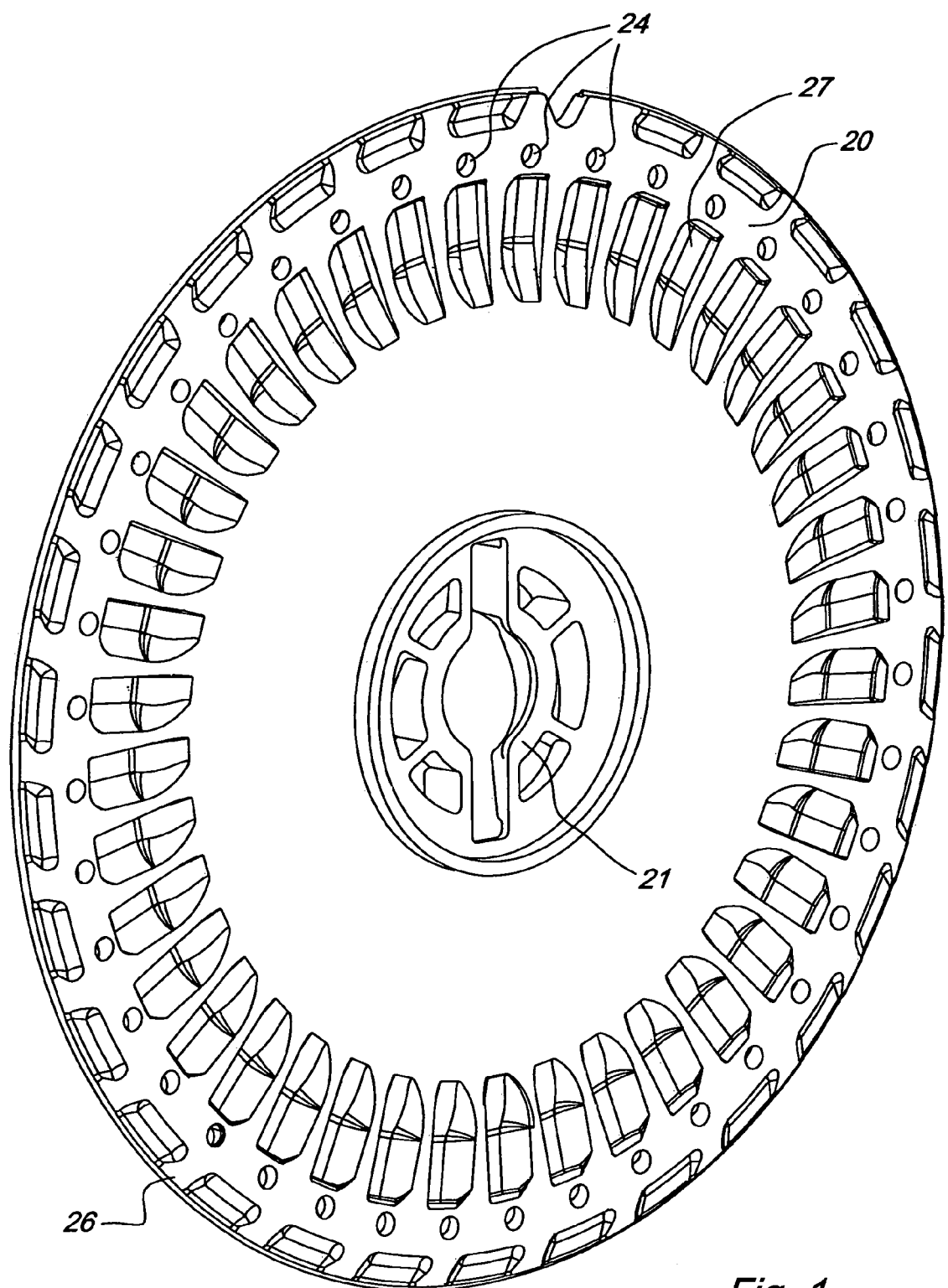
FIG. 1 is a perspective view of a flat type seed meter disk typical of the prior art.
Figure 2:
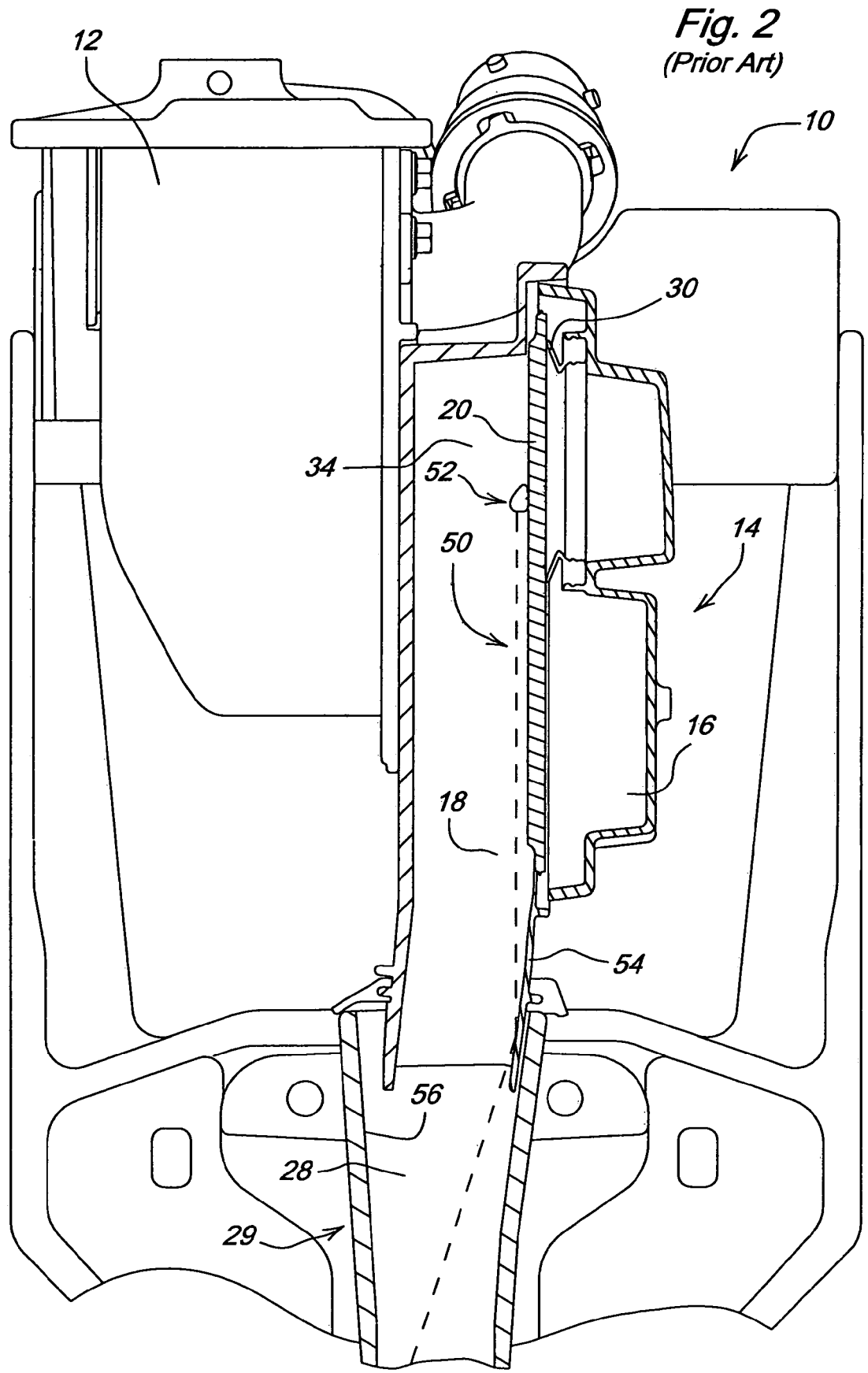
FIG. 2 a view partially in cross sectional showing a typical trajectory for the prior art seed disk of FIG. 1.
Figure 6:
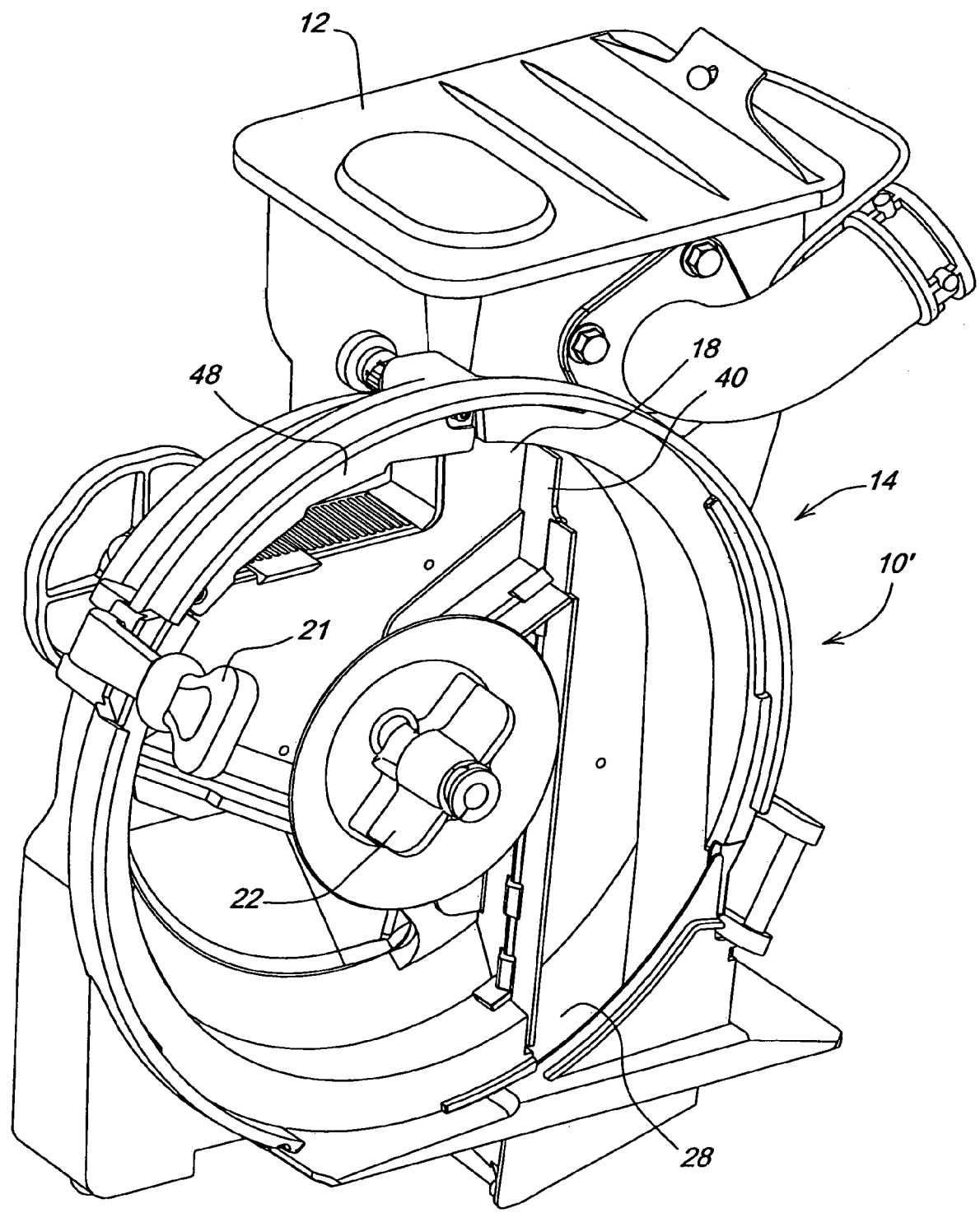
FIG. 6 is a perspective view the seed meter with parts removed to show the double eliminator and brush retainers for the disk of FIG. 3.

Referring to FIGS. 1 and 2, a seed meter 10 in communication with a seed hopper 12 includes a housing 14 rotatably supporting a seed disk 20. The housing 14 as shown includes has a vacuum side 16 and a seed receiving side 18 which are hinged together and secured in a closed position by a conventional latching arrangement (21 of FIG. 6). The rotatable seed disk 20 includes a hub portion 21 secured to a drive coupling 22.

The seed disk 20, which is shown as a conventional flat sweet corn disk in FIGS. 1 and 2, includes a series of apertures 24 uniformly spaced radially inwardly of a serrated cleanout and stirring edge 26 and passing from the seed side of the disk 20 through to the vacuum side of the disk. Seed accelerating and stirring structure 27 extends radially inwardly from the apertures 24 on the seed side of the disk. As the periphery of the disk 20 passes through a supply or puddle of seed in the seed receiving side 18 of the housing 14, the vacuum communicated through the apertures 24 draws and holds seed against the apertures. The edge 26 and the structure 27 stir and accelerate the seed adjacent the disk to facilitate capture of the seed by the apertures 24.

The seed receiving side 18 communicates with a supply of seed in the hopper 12. An outlet 28 connects the interior of the seed meter 10 to a seed tube 29 or other delivery device for directing the seed to the ground. The vacuum side 16 of the seed meter 10 is provided with a seal 30 which defines a seed a seed release zone 34 where the vacuum is isolated from the apertures 24 to release the seeds held on the apertures of the disk 20. The vacuum side 16 is coupled to a vacuum source (not shown). Although the present invention is being described as being used on a vacuum or negative air pressure seed meter it could also be used on a positive air pressure seed meter.

Seed deposited in the hopper 12 flows downwardly from the hopper 12 through an inlet into the seed receiving side 18 of the housing 14. The seed forms a puddle at the bottom of the housing defined by the seed disk 20 and the seed receiving side 18. Brush retainers 40 form a barrier in the housing 14 that prevents seeds in the seed puddle from directly entering the outlet 28. A vacuum is applied to a seed trapping zone on the vacuum side 16 which draws air from the seed receiving side 18 through apertures 24. This flow of air attracts seeds to the apertures and holds the seeds on the apertures. Further rotation takes the seed out of the area defined by the seed trapping zone to the seed release zone defined by seal 30. No vacuum exists in the seed release zone so the seed is released from the seed disk and falls into outlet 28. From the outlet 28, the seed is directed through the seed tube 29 to the planting furrow. A doubles eliminator 48 is connected to the housing on the seed side of the disk to eliminate any incidences of multiple seeds in an aperture.

As can be seen in FIG. 2, a seed trajectory 50 extends downwardly from a seed release point 52. The trajectory 50 of the seed tends to brush an uppermost portion of a proximate wall 54 at the outlet 28 causing the falling seeds to bounce towards a distal wall 56. Additional seed bounce initiated as a result of the seeds hitting the wall close to the uppermost portion of the outlet causes unpredictable irregularity in seed spacing in the furrow.

Figure 3:
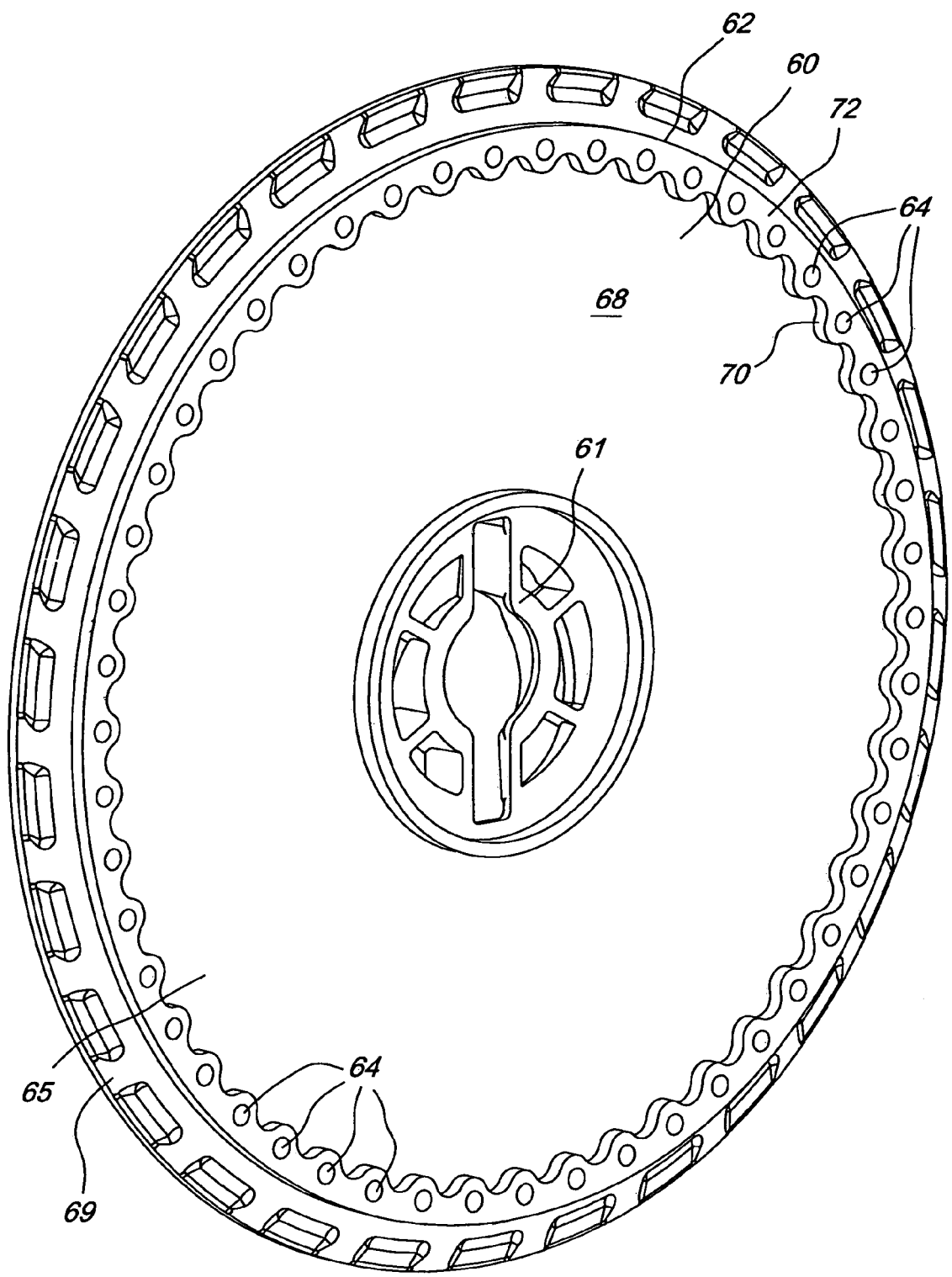
FIG. 3 is a perspective view of a flat type seed meter disk having axial offset for improved seed trajectory.
Figure 4:
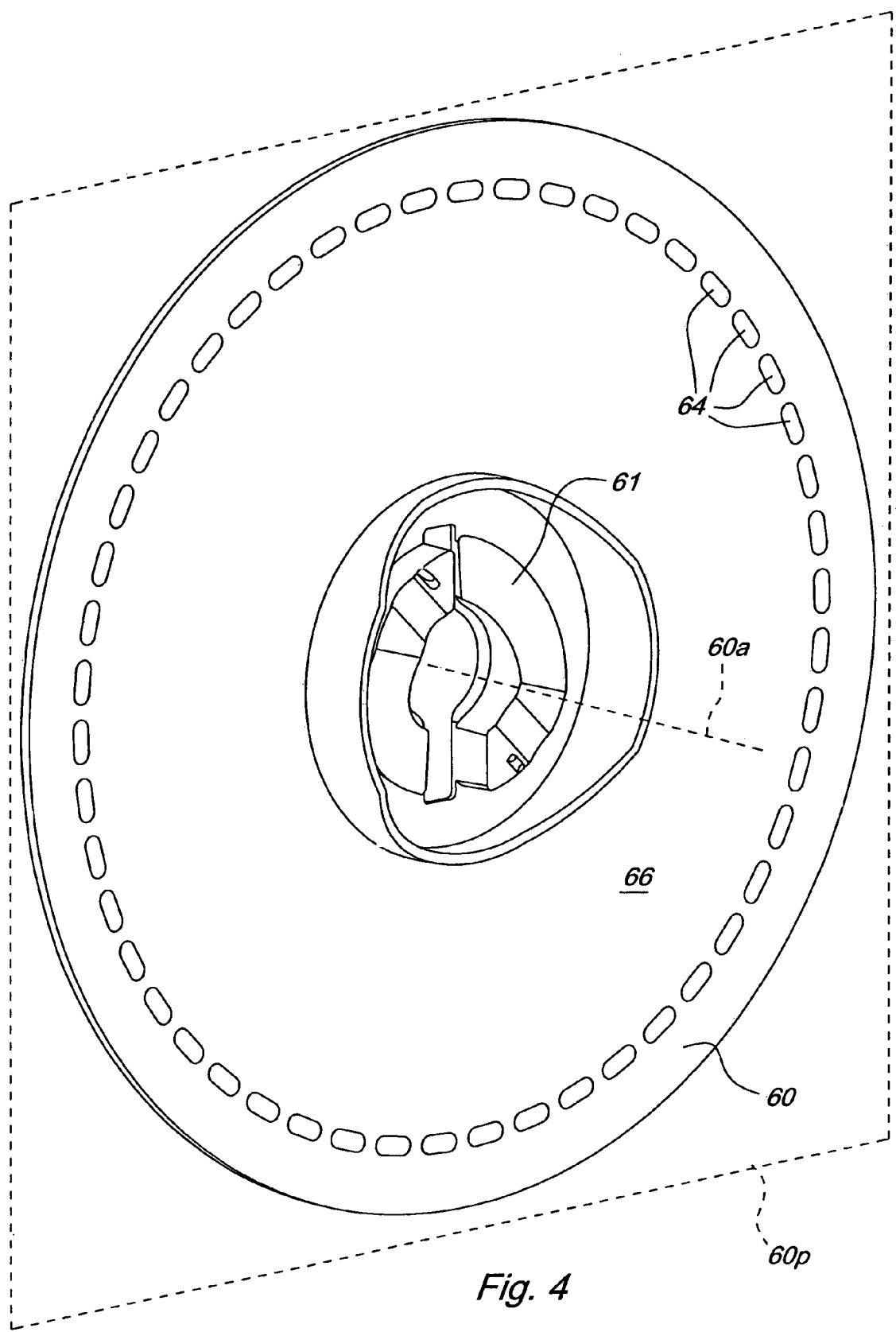
FIG. 4 is is a perspective view of the rear side of the disk of FIG. 3.
Figure 5:
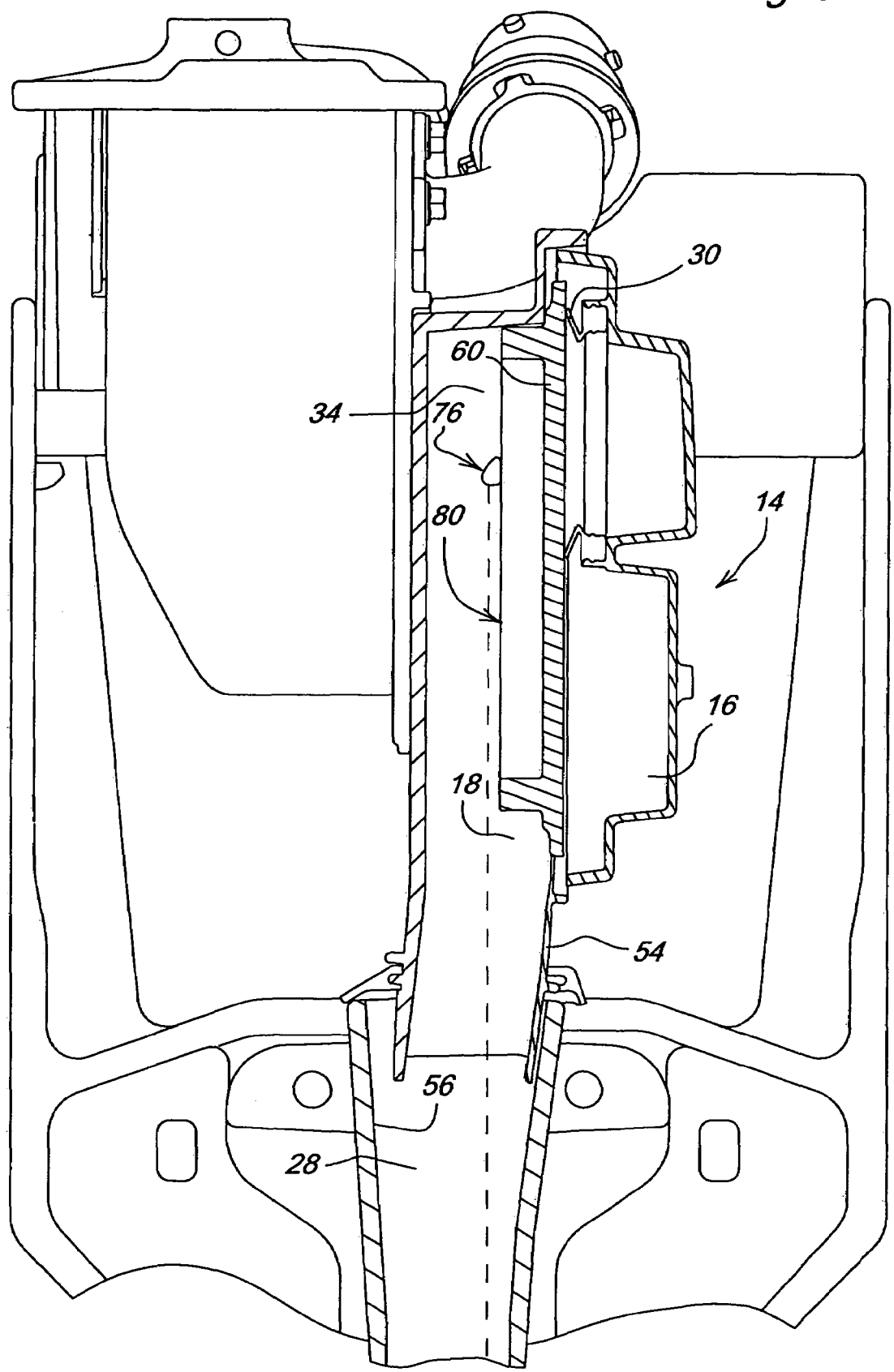
FIG. 5 is a view similar to FIG. 2 but showing the improved trajectory of the seed disk of FIG. 3.

Referring now to FIGS. 3-5, therein is shown an improved seed corn disk 60 having a central connection hub 61 and an outer rim portion 62. A plurality of apertures 64 are spaced uniformly about the rim portion 62 and extend from seed side 65 through to the opposite side 66 of the disk 60. The apertures are slightly enlarged on the opposite side 66 to facilitate passing of dirt and debris that might otherwise catch in the apertures. The disk 60 rotates generally in a rotational plane 60p about an axis 60a.

The outer rim portion 62 is raised relative to a generally planar central portion 68 which extends between the rim portion 62 and the hub 61. Seed stirring and accelerating structure 69 is located radially outwardly of the rim portion 62. An inner rim boundary portion or wall 70 extends axially inwardly from a generally flat rim face 72. The rim boundary portion 70 is tortuous or wavy (FIG. 3) and generally follows a path offset from an inner portion of the apertures 64 to define a seed stirring and accelerating portion to facilitate capture of the seeds in the apertures on the seed side 65 of the disk 60.

As shown in FIG. 5, the offset of the rim face 72 causes release point 76 of each captured seed to extend axially in the direction of the seed side 65 of the disk so that the seed falls more centrally relative to the outlet 28 along a trajectory 80 offset inwardly from the proximate wall 54, compared to the trajectory 50 for the prior art disk 20 of FIG. 2. The new trajectory 80 reduces unwanted seed bounce and results in more uniform seed spacing in the furrow.

Figure 7:
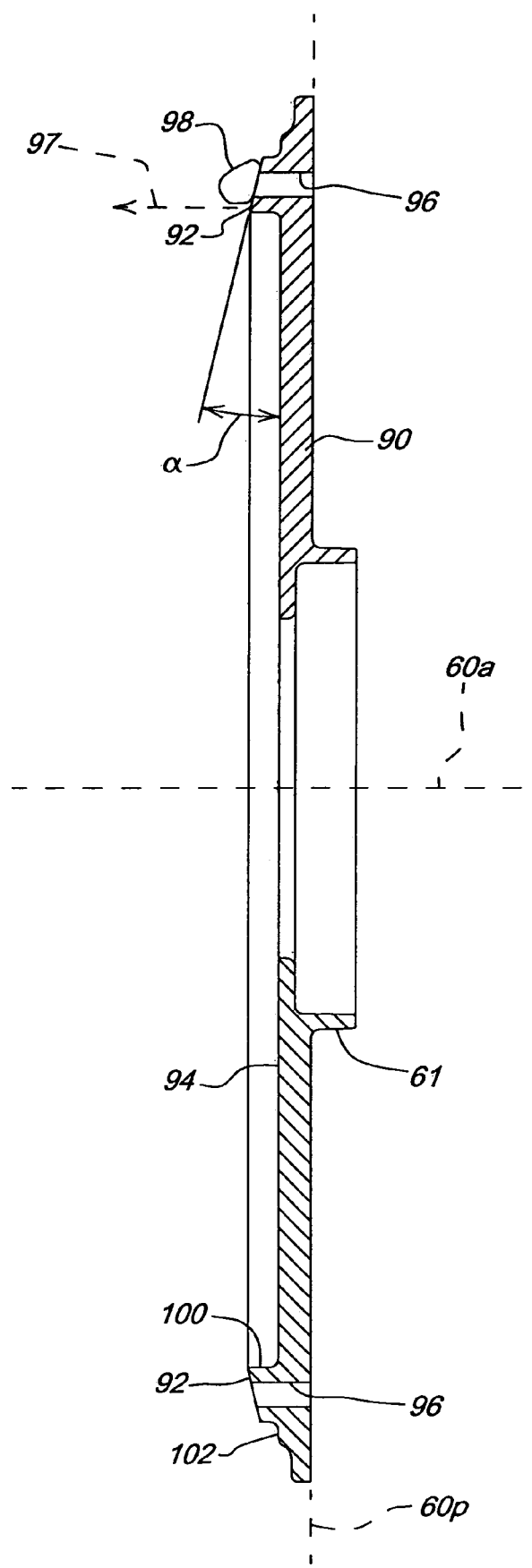
FIG. 7 is an end view partially in section showing an embodiment of a seed disk with an offset surface that is angled to improve seed trajectory.

Referring to FIG. 7, a further enhancement shown on the disk 90 includes an offset axially facing surface 92 raised relative to a generally planar central portion 94 of the disk and sloped at an acute angle a with respect to a disk rotational plane 6p to cause seed released from apertures 96 to follow an improved trajectory to reduce unwanted seed bounce. As shown, the angled surface 92 at the apertures 96 imparts an axial component 97 to seed 98 when released cause the seed to fall at a more central location relative to the outlet 28. If desired, a wall 100 extending from the surface to the central planar portion 94 can be shaped to provide seed agitation for improved seed pickup at the apertures 96. Ribbed seed stirring and acceleration structure is provided at 102 radially outwardly of the apertures 96.

Having described the preferred embodiment, it will become apparent that various modifications can be made without departing from the scope of the invention as defined in the accompanying claims.

The invention claimed is:

1. A seed disk for an air pressure seed meter comprising;
a circular disk member having a seed contacting side and an opposite rear side and adapted for rotation about a disk axis with the seed contacting side in communication with a source of seeds;
the disk member including an outer raised rim portion extending axially from a remainder portion of the disk member, the raised rim portion integral with the remainder portion;
a plurality of apertures extending through the raised rim portion from the seed contacting side to the opposite rear side; and
wherein the raised rim portion includes a flat portion and defines an axially facing flat seed receiving portion with the apertures defining seed retention areas on the rim portion, wherein the apertures extend continuously through the rim portion uninterruptedly into the seed retentions areas.

2. The disk as set forth in claim 1 wherein the disk rotates in a disk plane and the flat portion is angled with respect to the disk plane to define an angled seed release area nonparallel to the disk plane, the angled seed release area directing the seed along a trajectory to avoid seed bounce.

3. The disk as set forth in claim 1 wherein the raised rim portion includes an inner wall extending axially from the seed receiving portion.

4. The disk as set forth in claim 1 further comprising an agitation area radially outwardly of the raised rim portion wherein the raised rim portion is offset above the agitation area.

5. The seed disk as set forth in claim 1 wherein the circular disk member has a disk thickness equal to a distance between the seed contacting side and the opposite rear side, and wherein the outer raised rim portion extends axially from the remainder portion a distance approximately equal to or greater than the disk thickness.

6. A seed disk for an air pressure seed meter comprising:
a circular disk member having a seed contacting side and an opposite rear side and adapted for rotation about a disk axis with the seed contacting side in communication with a source of seeds;
the disk member including an outer raised rim portion extending axially from a remainder portion of the disk member;
a plurality of apertures extending through the raised rim portion from the seed contacting side to the opposite rear side;
wherein the raised rim portion includes a flat portion and defines an axially facing flat seed receiving portion with the apertures defining seed retention areas on the rim portion;
wherein the raised rim portion includes an inner wall extending axially from the seed receiving portion; and
wherein the inner wall is tortuous to define a seed agitation and acceleration member.

7. A seed disk for an air pressure seed meter comprising:
a circular disk member having a seed contacting side and an opposite rear side and adapted for rotation generally in a disk plane about a disk axis with the seed contacting side in communication with a source of seeds;
the disk member including a central generally planar portion and an outer raised rim portion extending axially from the planar portion and offset from the planar portion a distance at least equal to the a distance between the seed contacting side and the rear side;

a plurality of apertures extending through the raised rim portion from the seed contacting side to the opposite rear side; and wherein the raised rim portion defines an axially facing and generally flat seed receiving potion with the apertures defining seed retention areas on the rim portion.

8. The disk as set forth in claim 7 wherein the raised rim portion includes an inner wall extending between the planar portion and the flat seed receiving portion and defining a seed agitation and acceleration member radially inwardly of the seed retention areas.

9. The disk as set forth in claim 7 wherein the raised rim portion is angled with respect to a seed disk rotation plane to impart an axial component to a trajectory of seed exiting the raised rim portion.

10. The disk as set forth in claim 9 further comprising an agitation area radially outwardly of the raised rim portion, wherein the raised rim portion is offset axially above the agitation area.

11. A seed disk for an air pressure seed meter comprising:

a circular disk member having a seed contacting side and an opposite rear side and adapted for rotation about a disk axis with the seed contacting side in communication with a source of seeds;

the disk member including a generally planar portion and a raised rim portion extending axially from the planar portion and offset axially from the planar portion;

a plurality of apertures extending continuously through the raised rim portion from the seed contacting side to the opposite rear side;

wherein the raised rim portion comprises an axially facing seed receiving portion with the apertures defining seed retention areas on the rim portion, the seed retention areas opening uninterruptedly into the apertures; and a wall portion extending between the raised rim portion and the planar portion, the wall portion defining a seed agitation member radially inwardly of the seed retention areas.

12. The disk as set forth in claim 11 further comprising a seed agitation area offset radially outwardly of the raised rim portion.

13. The disk as set forth in claim 12 wherein the seed agitation area is offset axially from the raised rim portion.

14. The disk as set forth in claim 11 wherein the axially facing seed receiving portion with the apertures is angled with respect to the disk plane and imparts an axial component to a seed trajectory defined as seeds exit the seed retention areas.

15. The disk as set forth in claim 11 wherein the disk member is of single piece construction and wherein the raised rim portion is integral with the planar portion.

16. A seed disk for an air pressure seed meter comprising:

a circular disk member having a seed contacting side and an opposite rear side and adapted for rotation about a disk axis with the seed contacting side in communication with a source of seeds;

the disk member including a generally planar portion and an outer rim portion extending axially from the planar portion and offset axially from the planar portion;

a plurality of apertures extending through the raised rim portion from the seed contacting side to the opposite rear side;

wherein the raised rim portion comprises an axially facing seed receiving portion with the apertures defining seed retention areas on the rim portion;

a wall portion extending between the raised rim portion and the planar portion, the wall portion defining a seed agitation member radially inwardly of the seed retention areas; and wherein the wall portion comprises a tortuous member extending generally perpendicular to the planar portion.

17. A seed disk for an air pressure seed meter comprising:

a circular disk member having a seed contacting side and an opposite rear side lying generally in a disk plane and adapted for rotation about a disk axis with the seed contacting side in communication with a source of seeds;

the disk member including an outer seed receiving portion extending axially from a remainder portion of the disk member;

a plurality of apertures extending through the seed receiving portion from the seed contacting side to the opposite rear side, the apertures communicating a differential pressure to the seed contacting side of the seed receiving portion to capture seed at the apertures and deliver seeds to a seed release point; and wherein the seed receiving portion includes an angled surface at the apertures, the angled surface sloped at an acute angle greater than zero degrees with respect to the plane and imparting an axial component to a trajectory of seeds released from the apertures at the seed release point.

18. The seed disk as set forth in claim 17 wherein the raised seed receiving portion comprises a circumferential rim portion, and the angled surface comprises a generally continuous axially facing flat surface.

19. The seed disk as set forth in claim 18 further comprising a seed agitation surface extending generally axially from the flat surface to an offset central portion of the disk.

20. The seed disk as set forth in claim 19 further comprising seed agitation structure offset radially outwardly from the apertures.

* * * * *